Dec. 13, 1966  A. WAGNER  3,291,016
PHOTOGRAPHIC CAMERA WITH PHOTOELECTRIC LIGHT
METER COUPLED THERETO
Filed Nov. 7, 1963  3 Sheets-Sheet 1

INVENTOR
ADAM WAGNER
BY Toulmin & Toulmin
Attorneys

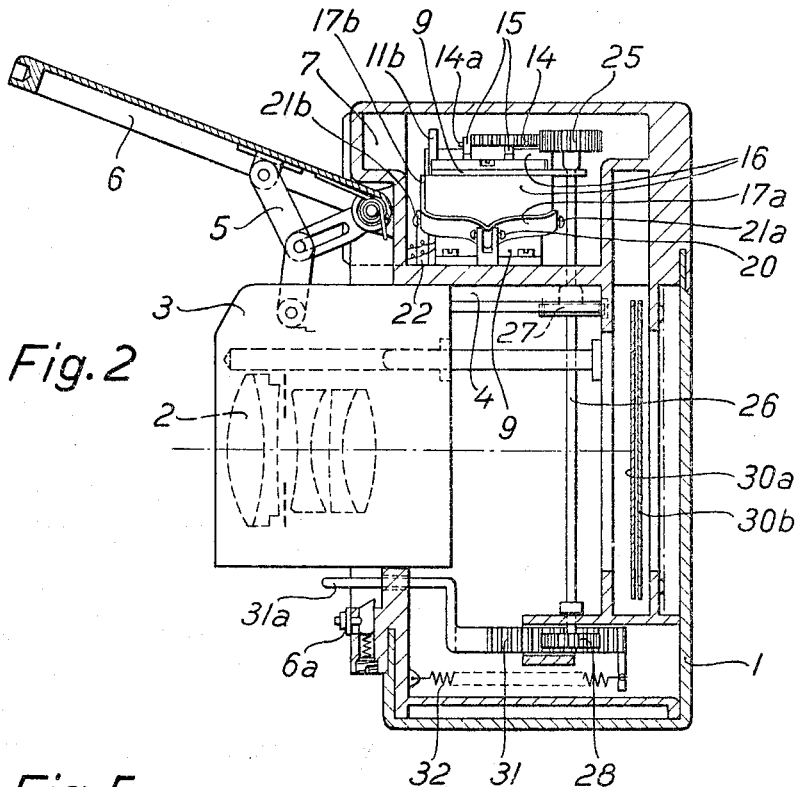
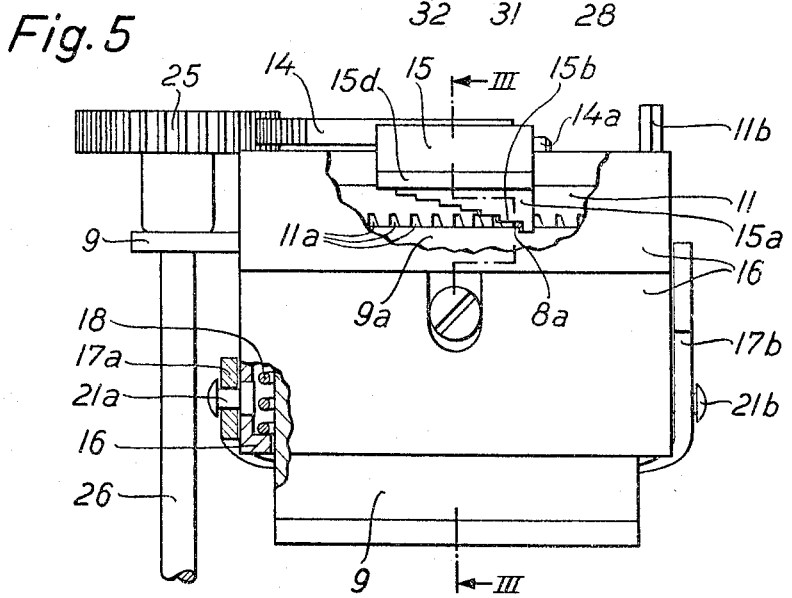

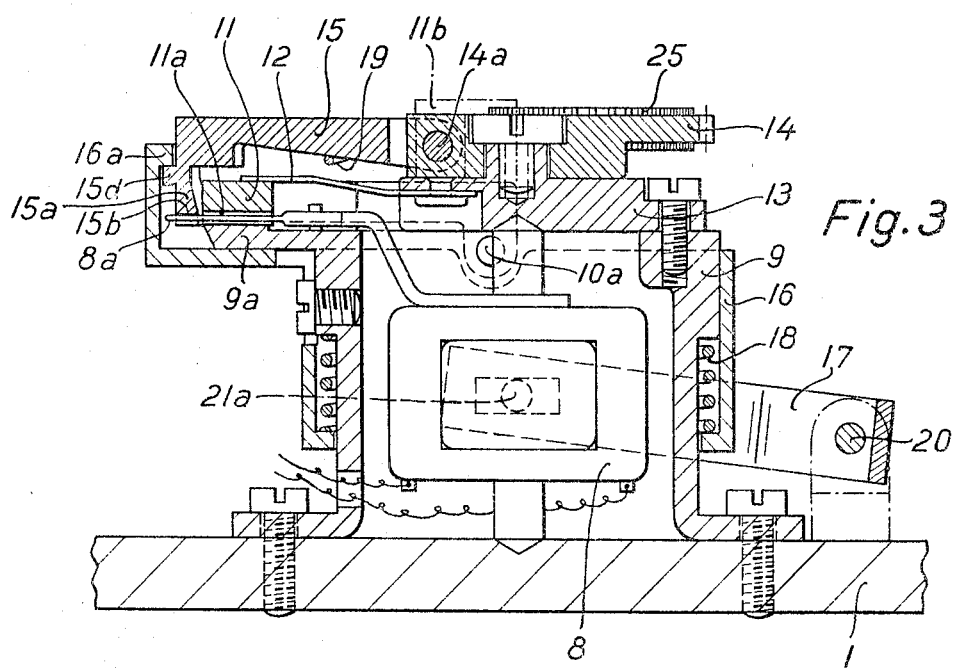
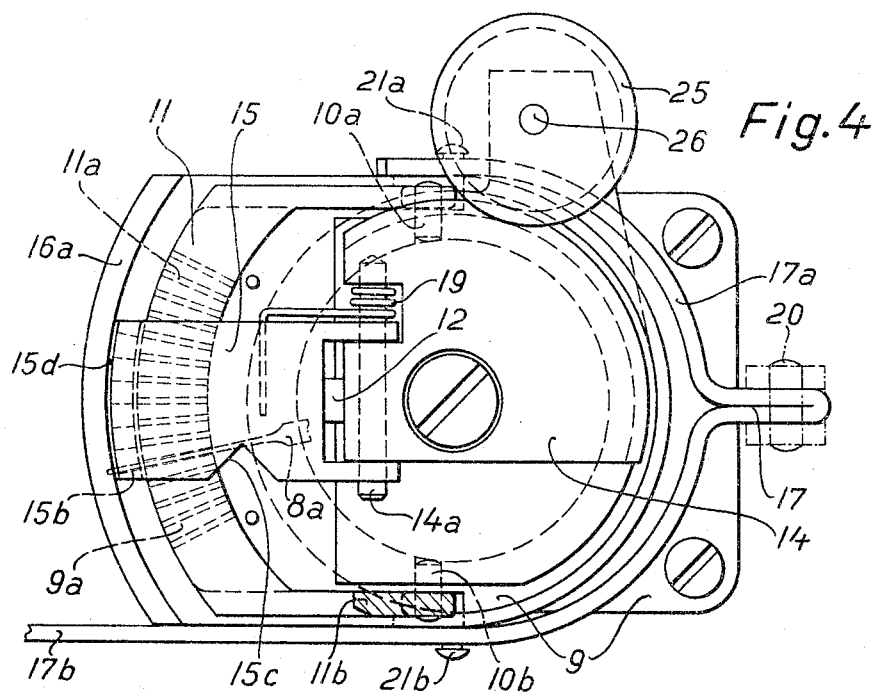

3,291,016
PHOTOGRAPHIC CAMERA WITH PHOTOELECTRIC LIGHT METER COUPLED THERETO
Adam Wagner, Wetzlar, Germany, assignor to
Ernst Leitz G.m.b.H., Wetzlar, Germany
Filed Nov. 7, 1963, Ser. No. 322,095
9 Claims. (Cl. 95—10)

This invention relates to cameras having automatic photoelectric exposure setting means and, particularly, to a camera of the kind disclosed, for example, in German Patent A 1,251/B 2,088 of Nov. 15, 1961.

Cameras of the type referred to are known in which coverable objective lens means carriers are provided which can be moved into position by a spring in the camera housing upon releasing of the cover and the camera can then be operated after uncovering the objective lens means.

Cameras with photoelectric exposure regulators are also known in which there is a meter operated by the photocell and a pressure operable button operatively connected to a movable contact member, said button being operable for moving the contact member to retracted position away from the meter pointer when the button is depressed. Upon retracted release of the button the contact member moves away from its position toward the needle of the light meter until it encounters the pointer of the meter whereupon the contact member is halted. It has also been known to use this return movement of the contact member for adjusting the exposure setting of the camera as by setting the exposure time and/or diaphragm opening of the camera.

A difficulty with these known devices—spring operated cameras on the one hand, and cameras with pressure operable button exposure regulators on the other hand, is that it takes some considerable time to get the camera ready for taking a picture. This naturally limits the usefulness of the camera for taking snapshots. In spring cameras which have also pressure button exposure regulators these time requirements become additive and increase the delay.

The object of this invention is to shorten the time required for bringing such spring and exposure regulating cameras into condition for taking a picture. The basic idea of this invention is to move the objective into position while simultaneously the setting of the exposure timing and/or diaphragm setting is accomplished.

In the present invention this is accomplished by coordinating the control member of the exposure regulator with the objective cover, or with a member constrained to coact therewith, in such a manner that the control member is actuated to move a hold-down member for the meter pointer into retracted position while the cover is in closed position.

While the cover is in its closed position the hold-down member therefore remains continually in retracted position by engaging a resilient lever that forms part of the holding mechanism for the meter pointer. The mechanism upon being released from its retracted position will move into position to hold the meter pointer in the position into which it has moved in response to the light intensity.

To prepare the camera for taking a picture it is necessary only to direct the camera toward the object to be photographed and to release the resiliently restrained cover and the objective lens means from closed position whereupon movement thereof into the picture taking position will occur. The control member which is kept in its retracted position by the cover member when the latter is closed, will be released when the cover is opened. The control member will then move from its retracted position and, during the first phase of its movement, will permit the hold-down member to come down upon and clamp the meter pointer. The control member then continues to move until it encounters the now clamped meter pointer. The adjustment of the camera setting devices (i.e. time or diaphragm or both) for the required time and diaphragm settings will then be determined by the final position of the control member which is, of course, determined by the clamped position of the meter pointer.

After being released by the cover, the push button pertaining to the control member will be exposed so as to be readily accessible and can be manually actuated as often as desired to make the required settings for different exposures.

In the drawings which show one example of this invention

FIGURE 2 is a side view in cross section of the camera;

FIGURE 3 is a front view in cross section on the line 3—3 of FIGURE 5 of the measuring apparatus showing the operating mechanism and the clamping device for the meter pointer;

FIGURE 4 is a plan view of the measuring apparatus of FIGURE 3; and

FIGURE 5 is a side view of the measuring apparatus.

Figure 1:
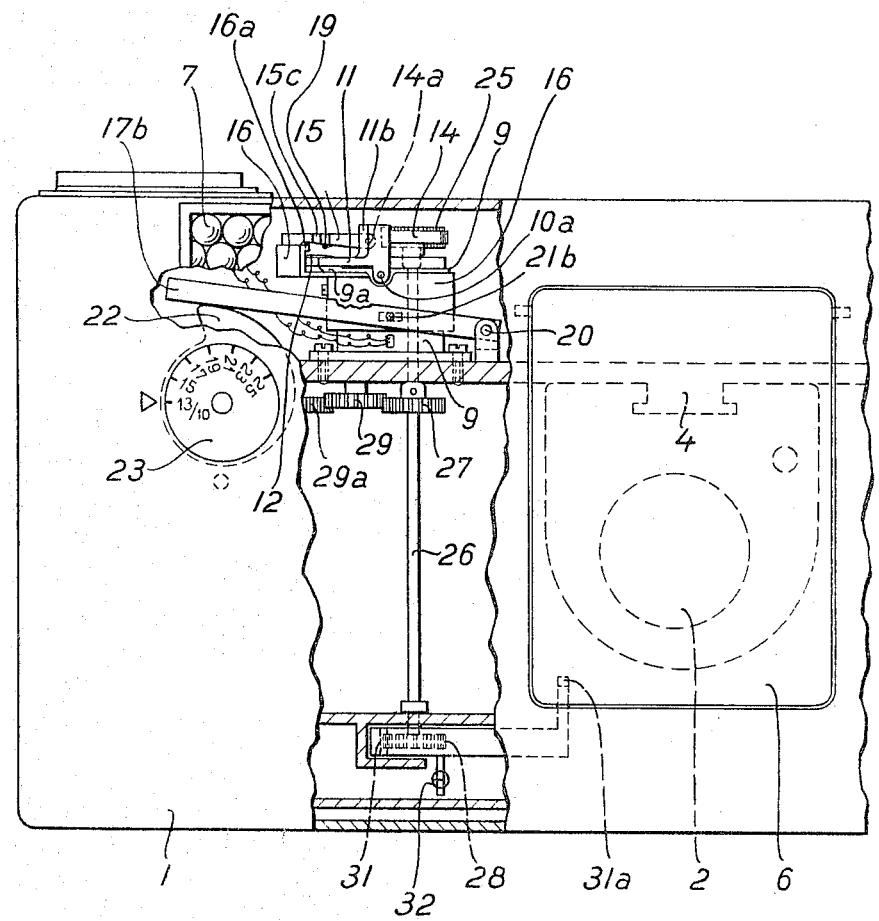
FIGURE 1 is a front view, partly in cross section, of a spring camera with a pressure lever exposure regulator for regulating the exposure time by positioning the pressure lever in the field of action of the flap cover.

As shown in FIGURES 1 and 2, the housing 1 of the spring camera has mounted in it a camera objective 2 by means of an objective-carrier 3 longitudinally slidable on a guide rail 4. A flap-cover 6 is resiliently connected with the objective carrier 3 by means of lever mechanism 5 (FIGURE 2), the flap-cover being held down in its closed position by a latch 6a in the housing. The camera is also equipped with an exposure meter consisting essentially of a photocell 7 connected to a meter 8 (FIGURE 3) whose pointer 8a (FIGURE 4) is cooperatively related to the holding and contacting mechanism.

The holding mechanism for the meter pointer 8a (FIGURES 3 and 4) is carried by the housing 9 which surrounds the meter and which carries an arcuate platform 9a whose supporting surface is parallel to the plane of movement of the meter pointer. An arcuate hold-down yoke 11 is pivotally mounted on axes 10a and 10b on the housing 9 for movement down upon the platform 9a. The arcuate portion of the yoke 11 is provided on its lower side adjacent the pointer and the platform with radial grooves 11a. The yoke 11 is urged toward the platform by a leaf spring 12 (FIGURE 3) and during such movement the pointer will become loosely entrapped in the nearest groove without appreciable change of position of the pointer. The platform will then have closed the grooves so as to keep the pointer clamped in the same groove in which it has become entrapped.

The yoke 11 carries an abutment 11b (FIGURES 1 and 4) engageable by a shoulder 15c on the control member 15 to lift the yoke when the control member and the gear segment 14 on which it is pivotally mounted on an axis 14a are swung into their one terminal or retracted position.

The gear segment 14 is pivotally mounted on a bridge 13 of the housing 9, the pivot axis being in alignment with the pivot axis of the meter pointer while the axis 14a on which the control member 15 is pivoted is transverse to the meter axis. The end 15a of the control member is adapted to engage the end of the pointer when the latter is clamped and carries a series of abutment steps 15b (FIGURE 5) for selectively engaging the end of the pointer for maintaining a constant exposure factor for different film sensitivities by adjusting the elevation of the control member 15. In order to keep the control member at any selected elevation to make a predetermined step effective to engage the meter pointer, a setting mechanism for the control member is provided comprising a sleeve 16 slidable on the housing 9 by means of a one-armed lever 17 acting in opposition to the spring 18. The sleeve 16 carries at one side thereof a U-shaped portion 16a for receiving a lug 15d on the end of the control member 15. A spring 19 urges the control member upwardly until its lug 15d encounters the portion 16a. The lever 17 is pivotable on the axis 20 and is fork-shaped, its two prongs 17a and 17b engaging the trunnions 21a and 21b on the sleeve 16. The fork 17b is elongated and engages a cam 22 (FIGURE 1) which can be adjusted by a knob 23 on the outside of the camera to compensate for film sensitivity by bringing the required abutment step 15b into position for engaging the meter pointer 8a.

The gear segment 14 meshes with a gear 25 on a shaft 26 (FIGURES 1 and 2) journaled in the housing 1.

The shaft 26 also carries two additional gears 27 and 28. The gear 27 is connected through gearing 29, 29a with the time-setting element of a shutter in the form of a slit closure of known construction comprising the curtains 30a, 30b. The gear 28 meshes with a rack 31 which carries at its front end an extension 31a, forming the previously mentioned push button, extending through an opening in the camera wall into the path of the pivoted cover 6, to be pressed in the direction of the film and against the tension of the spring 32.

OPERATION

To explain the functioning of the above described apparatus, it will first be assumed that the cover 6 is closed and is held in closed position by the latch 6a. The rack 31 and its extension or push button 31a are then held back and having acted through gear 28, shaft 26 and gear 25, has turned the gear segment 14 into its retracted position. While moving into this retracted end position the shoulder 15c of the control member 15 will engage the abutment 11b of the hold-down yoke 11 to lift the latter. The meter pointer 8a is thus unclamped and can then swing freely over the arcuate platform.

When the camera with its photocell 7 is pointed at an object, the meter pointer 8a will assume a position that is determined by the brightness of the object. The position which is thus assumed by the meter pointer will have been compensated for the setting of the diaphragm if the diaphragm setting mechanism is connected in a known manner with a variable resistor in series with the photocell and meter, or with an adjustable shade for the photocell, also known.

If now the latch 6a is released, the cover 6 will spring open while the objective 2 moves into position for taking a picture. At the same time the rack 31 with its extension 31a will be released and will be moved forward by the spring 32 thereby rotating the shaft 26 and gear 25 to bring the gear segment 14 out of its terminal retracted position. At the very beginning of this movement the control member 15 will release the hold-down yoke 11 which will be brought down upon the arcuate platform 9a by the spring 12 and will capture the instrument pointer 8a in the nearest radial groove 11a and hold it in that position. During its continued movement the control member 15 will encounter the end of the now stationary clamped pointer 8a which will serve as an abutment for stopping the movement of the control member. This limited movement of the control member 15 will have actuated the gear train 29, 29a to set the shutter for the corresponding exposure time, so that now the camera will be set for both diaphragm adjustment and exposure time. The proportions are so chosen that the time it takes to move the flap-cover into open position and the objective into picture-taking position, will also be sufficient to permit the shutter to be set for the correct exposure time as determined by the position of the entrapped meter pointer.

The sensitiveness or speed of the film is compensated for by adjustment of the knob 23 and cam 22 to lift or lower the lever 17b and with it the sleeve 16 which carries the U-shaped extension 16a to hold the lug 15a of control member 15 in position against the force of the spring 19. By raising or lowering the control member 15 any selected abutment step 15b can be brought into the path of the pointer 8a. In this manner the extent of swinging movement of the control member 15 will be determined by the setting of the knob 23 to adjust for film sensitivity, and this will react upon the timing mechanism of the shutter. The separation of the abutment steps from one another will be determined by the exposure values or exposure times and/or the diaphragm intervals and is preferably according to a geometric progression.

As will be seen in FIGURE 1, the camera may comprise an adjustable element T for controlling the time setting of the camera, namely, the exposure time which generally is in the form of the adjustment of the shutter speed of the camera. The camera can also comprise an adjustable element for adjusting the diaphragm opening of the camera. Each of these elements, of course, control the exposure conditions of the film in the camera and are thus exposure regulating means in the broad sense of this term.

The gear 29a which is rotated when the control means of the camera operates can be connected to either or both of the elements T, D thereby to control the exposure conditions of the film. Generally, gear 29a would be connected to one only of the elements as, for example, the time setting element T. As is known, if the gear 29a is connected to element T, element D is manually adjusted and it may be connected to resistance means R in circuit with the photocell and meter so that adjustment of element D will control the response of the meter to the output of the photocell and thereby compensate the adjustment of element T when the control means is operated. Similarly, element D could be attached to a movable shield disposed in front of the photocell so that in accordance with adjustments of element D the shield could be moved, thereby to effect the necessary compensation in the meter response to insure that the setting of element T by the control means would give the proper shutter speed.

It will be understood that this invention is susceptible to modification in order to adapt it to different usages and conditions; and accordingly, it is desired to comprehend such modifications within this invention as may fall within the scope of the appended claims.

I claim:

1. In a camera; a case, an objective lens means movable in said case and spring urged toward operative position, a cover for said objective lens means movable on the case operable when closed to hold said objective lens means in retracted position and operable when opened to release said objective lens means for movement to operative position, a photocell on the case, a meter in the case in circuit with the photocell having a pointer movable in accordance with the light falling on the photocell, clamp means operable for clamping said pointer in its respective position, feeler means movable in one direction in the path of the pointer for engagement with the pointer when the latter is clamped so as to be stopped by the pointer and thereby detect the position of the pointer, control means connected to said clamp means and said feeler means and having one position wherein said clamp means and said feeler means are retracted away from said pointer, said control means being spring urged away from said position for first releasing said clamp means to clamp said pointer and for then moving said feeler means in said one direction into engagement with said clamped pointer, means operated by movement of said feeler means for adjusting at least one of the diaphragm opening and shutter speed of said camera, and means interconnecting said cover and control means for moving said control means into its said one position when the cover is closed and for releasing said control means when the cover is opened.

2. In a camera; a case, an objective lens means movable in said case and spring urged toward operative position, a cover for said objective lens means movable on the case operable when closed to hold said objective lens means in retracted position and operable when opened to release said objective lens means for movement to operative position, a photocell on the case, a meter in the case in circuit with the photocell having a pointer movable in accordance with the light falling on the photocell, clamp means operable for clamping said pointer in its respective position, feeler means movable in one direction in the path of the pointer for engagement with the pointer when the latter is clamped so as to be stopped by the pointer and thereby detect the position of the pointer, control means connected to said clamp means and said feeler means and having one position wherein said clamp means and said feeler means are retracted away from said pointer, said control means being spring urged away from said position for first releasing said clamp means to clamp said pointer and for then moving said feeler means in said one direction into engagement with said clamped pointer, and means operated by said feeler means for adjusting at least one of the diaphragm opening and shutter speed of said camera, said control means comprising a plunger element disposed in said case in the path of said cover so as to be moved by the cover into said one position when the cover is closed, said plunger means being disposed for manual operation when said cover is open.

3. In a camera; a case, an objective lens means movable in said case and spring urged toward operative position, a cover for said objective lens means movable on the case operable when closed to hold said objective lens means in retracted position and operable when opened to release said objective lens means for movement to operative position, a photocell on the case, a meter in the case in circuit with the photocell having a pointer movable in accordance with the light falling on the photocell, clamp means operable for clamping said pointer in its respective position, feeler means movable in one direction in the path of the pointer for engagement with the pointer when the latter is clamped so as to be stopped by the pointer and thereby detect the position of the pointer, control means connected to said clamp means and said feeler means and having one position wherein said clamp means and said feeler means are retracted away from said pointer, said control means being spring urged away from said position for first releasing said clamp means to clamp said pointer and for then moving said feeler means in said one direction into engagement with said clamped pointer, and means operated by said feeler means for adjusting at least one of the diaphragm opening and shutter speed of said camera, said control means comprising a plunger element disposed in said case in the path of said cover so as to be moved by the cover into said one position when the cover is closed, said plunger means being disposed for manual operation when said cover is open, said clamp means comprising a yoke element pivotally mounted in said case and spring urged toward said pointer and an abutting connection between said control means and said yoke for moving the latter away from said pointer when the control means is moved into said one position.

4. In a camera; a case, an objective lens means movable in said case and spring urged toward operative position, a cover for said objective lens means movable on the case operable when closed to hold said objective lens means in retracted position and operable when opened to release said objective lens means for movement to operative position, a photocell on the case, a meter in the case in circuit with the photocell having a pointer movable in accordance with the light falling on the photocell, clamp means operable for clamping said pointer in its respective position, feeler means movable in one direction in the path of the pointer for engagement with the pointer when the latter is clamped so as to be stopped by the pointer and thereby detect the position of the pointer, control means connected to said clamp means and said feeler means and having one position wherein said clamp means and said feeler means are retracted away from said pointer, said control means being spring urged away from said position for first releasing said clamp means to clamp said pointer and for then moving said feeler means in said one direction into engagement with said clamped pointer, and means operated by said feeler means for adjusting at least one of the diaphragm opening and shutter speed of said camera, said control means comprising a plunger element disposed in said case in the path of said cover so as to be moved by the cover into said one position when the cover is closed, said plunger means being disposed for manual operation when said cover is open, said feeler means comprising a member having a plurality of stops formed thereon adapted for selective positioning in the path of said pointer, and means operable from externally of said camera for adjusting said member.

5. In a camera; a case, an objective lens means movable in said case and spring urged toward operative position, a cover for said objective lens means movable on the case operable when closed to hold said objective lens means in retracted position and operable when opened to release said objective lens means for movement to operative position, a photocell on the case, a meter in the case in circuit with the photocell having a pointer movable in accordance with the light falling on the photocell, clamp means operable for clamping said pointer in its respective position, feeler means movable in one direction in the path of the pointer for engagement with the pointer when the latter is clamped so as to be stopped by the pointer and thereby detect the position of the pointer, control means connected to said clamp means and said feeler means and having one position wherein said clamp means and said feeler means are retracted away from said pointer, said control means being spring urged away from said position for first releasing said clamp means to clamp said pointer and for then moving said feeler means in said one direction into engagement with said clamped pointer, and means operated by said feeler means for adjusting at least one of the diaphragm opening and shutter speed of said camera, said control means comprising a plunger element disposed in said case in the path of said cover so as to be moved by the cover into said one position when the cover is closed, said plunger means being disposed for manual operation when said cover is open, said feeler means comprising a member having a plurality of stops formed thereon adapted for selective positioning in the path of said pointer, and means operable from externally of said camera for adjusting said member, the said means for adjusting said feeler element comprising a sleeve in the camera connected with said feeler member, a lever pivoted in the camera and connected with said sleeve, and an adjustable knob in the camera operatively connected with said lever.

6. In a camera; a case, an objective lens means movable in said case and spring urged toward operative position, a cover for said objective lens means movable on the case operable when closed to hold said objective lens means in retracted position and operable when opened to release said objective lens means for movement to operative position, a photocell in the case, a meter in the case in circuit with the photocell having a pointer movable in accordance with the light falling on the photocell, clamp means operable for clamping said pointer in its respective position, feeler means movable in one direction in the path of the pointer for engagement with the pointer when the latter is clamped so as to be stopped by the pointer and thereby detect the position of the pointer, control means connected to said clamp means and said feeler means and having one position wherein said clamp means and said feeler means are retracted away from said pointer, said control means being spring urged away from said position for first releasing said clamp means to clamp said pointer and for then moving said feeler means in said one direction into engagement with said clamped pointer, and means operated by said feeler means for adjusting at least one of the diaphragm opening and shutter speed of said camera, said control means comprising a plunger element disposed in said case in the path of said cover so as to be moved by the cover into said one position when the cover is closed, said plunger means being disposed for manual operation when said cover is open, said feeler means comprising a member having a plurality of stops formed thereon adapted for selective positioning in the path of said pointer, and means operable from externally of said camera for adjusting said member, the intervals between said abutment means being selected to correspond to a geometric progression of one of exposure time, diaphragm opening, or light intensity.

7. In a camera; a case, an objective lens means movable in said case and spring urged toward operative position, a cover for said objective lens means movable on the case operable when closed to hold said objective lens means in retracted position and operable when opened to release said objective lens means for movement to operative position, a photocell on the case, a meter in the case in circuit with the photocell having a pointer movable in accordance with the light falling on the photocell, clamp means operable for clamping said pointer in its respective position, feeler means movable in one direction in the path of the pointer for engagement with the pointer when the latter is clamped so as to be stopped by the pointer and thereby detect the position of the pointer, control means connected to said clamp means and said feeler means and having one position wherein said clamp means and said feeler means are retracted away from said pointer, said control means being spring urged away from said position for first releasing said clamp means to clamp said pointer and for then moving said feeler means in said one direction into engagement with said clamped pointer, and means operated by said feeler means for adjusting at least one of the diaphragm opening and shutter speed of said camera, said control means including a plunger reciprocably mounted in the case and having an end part projecting outwardly therefrom or for engagement by said cover when the latter is moved to closed position, gearing connecting said plunger with said feeler means whereby when said plunger moves away from its said one position it is stopped when said feeler member engages the meter pointer, and other gearing connecting said plunger with the element of said camera to be adjusted whereby the adjustment of the element is in conformity with the stopped position of said feeler means as determined by the clamped position of said pointer.

8. In a camera; a case, an objective lens means movable in said case and spring urged toward operative position, a cover for said objective lens means movable on the case operable when closed to hold said objective lens means in retracted position and operable when opened to release said objective lens means for movement to operative position, a photocell on the case, a meter in the case in circuit with the photocell having a pointer movable in accordance with the light falling on the photocell, clamp means operable for clamping said pointer in its respective position, feeler means movable in one direction in the path of the pointer for engagement with the pointer when the latter is clamped so as to be stopped by the pointer and thereby detect the position of the pointer, control means connected to said clamp means and said feeler means and having one position wherein said clamp means and said feeler means are retracted away from said pointer, said control means being spring urged away from said position for first releasing said clamp means to clamp said pointer and for then moving said feeler means in said one direction into engagement with said clamped pointer, and means operated by said feeler means for adjusting at least one of the diaphragm opening and shutter speed of said camera, said control means including a plunger reciprocably mounted in the case and having an end part projecting outwardly therefrom for engagement by said cover when the latter is moved to closed position, gearing connecting said plunger with said feeler means whereby when said plunger moves away from its said one position it is stopped when said feeler means engages the meter pointer, and other gearing connecting said plunger with the element of said camera to be adjusted whereby the adjustment of the element is in conformity with the stopped position of said feeler member as determined by the clamped position of said pointer, said adjustable element of the camera comprising the means for adjusting the shutter speed thereof, a separate element on the camera for adjusting the diaphragm opening thereof, and means connected to said separate element and operatively associated with said photocell and meter for controlling the response of the latter to the light falling on the photocell.

9. In a camera; a movable cover adapted for being opened to expose the objective lens means of the camera, a photocell on the camera, a meter in the camera in circuit with the photocell and having a swingable pointer, first means in the camera mounted co-axially with the pointer for clamping the pointer into its respective position, second means in the camera also co-axial with the pointer movable into abutting engagement with the side of the pointer for thereby detecting the clamped position of the pointer, control means connected to said first and second means and having a first position wherein it holds said first and second means in retracted position to permit free movement of said pointer while pointing the camera toward a region to be photographed, said control means being operable when moved away from its said first position for first releasing said first means to effect clamping of the pointer and for then releasing said second means to detect the position of the pointer, means connected to said second means and operated thereby for adjusting the exposure conditions of the camera in conformity with the position occupied by said second means when it engages said pointer, spring means biasing said control means away from said first position, and plunger means connected to said control means and disposed in the path of said cover, said cover when being closed abuttingly engaging said plunger means and moving the plunger means so as to move said control means into its said first position, said cover when opened releasing said plunger means so said spring means can move said control means away from said first position thereof.

References Cited by the Examiner

UNITED STATES PATENTS 3,134,311    5/1964    Starp _____ 95—10

FOREIGN PATENTS 589,110    2/1959    Italy.

JOHN M. HORAN, *Primary Examiner.*